(12) United States Patent
Lieblein et al.

(10) Patent No.: US 10,012,284 B2
(45) Date of Patent: Jul. 3, 2018

(54) METHOD FOR FASTENING A REBOUND STOP TO A PISTON ROD OF A VIBRATION DAMPER

(71) Applicant: ZF FRIEDRICHSHAFEN AG, Friedrichshafen (DE)

(72) Inventors: Klaus Lieblein, Dittelbrunn (DE); Stefan Hochgesang, Salz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 141 days.

(21) Appl. No.: 15/029,221

(22) PCT Filed: Sep. 19, 2014

(86) PCT No.: PCT/EP2014/069977
§ 371 (c)(1),
(2) Date: Apr. 13, 2016

(87) PCT Pub. No.: WO2015/055375
PCT Pub. Date: Apr. 23, 2015

(65) Prior Publication Data
US 2016/0258505 A1 Sep. 8, 2016

(30) Foreign Application Priority Data
Oct. 14, 2013 (DE) .................. 10 2013 220 627

(51) Int. Cl.
*F16F 9/58* (2006.01)

(52) U.S. Cl.
CPC ........ *F16F 9/585* (2013.01); *F16F 2226/045* (2013.01); *F16F 2230/007* (2013.01)

(58) Field of Classification Search
CPC .. F16F 9/585; F16F 9/49; F16F 9/0454; F16F 9/0463; F16F 9/0472; F16F 9/052;
(Continued)

(56) References Cited

U.S. PATENT DOCUMENTS 1,685,834 A * 10/1928 Austin .................. B21D 53/00
29/509

FOREIGN PATENT DOCUMENTS

| DE | 78 10 988 | 8/1978 |
| DE | 85 20 989 | 9/1985 |

(Continued)

*Primary Examiner* — Jason L Vaughan
*Assistant Examiner* — Amanda Meneghini
(74) *Attorney, Agent, or Firm* — Cozen O'Connor

(57) ABSTRACT

A method for fastening a rebound stop to a piston rod of a vibration damper positioned at a piston rod and axially supported with a first tool. A second tool component having a press-in surface that presses the tubular portion of the rebound stop into the circumferential groove of the piston rod. The first and the second tool carry out an movement toward one another. At least one tool presses the tubular portion of the rebound stop into the circumferential groove of the piston rod. The pitch angle of the press-in surface varies over the axial longitudinal extension of the press-in surface. As the distance between the tools decreases, the force ratio between the axially directed pressing force and the radially directed pressing force changes such that the axially directed pressing force decreases and the radially directed pressing force increases.

6 Claims, 4 Drawing Sheets

(58) Field of Classification Search
CPC .. F16F 9/057; F16F 9/32; F16F 9/3221; F16F 9/3271; F16F 9/368; B60G 2204/4502; B60G 2204/4504; B60G 2204/45; B60G 15/06; B60G 13/08; Y10T 29/49908
See application file for complete search history.

(56) References Cited

FOREIGN PATENT DOCUMENTS

| | | |
|---|---|---|
| DE | 198 26 046 | 12/1999 |
| DE | 10 2004 039702 | 7/2006 |
| DE | 10 2005 029938 | 11/2006 |
| DE | 10 2007 014247 | 9/2008 |
| DE | 78 37 029 | 4/2012 |
| DE | 10 2011 089140 | 3/2013 |

\* cited by examiner

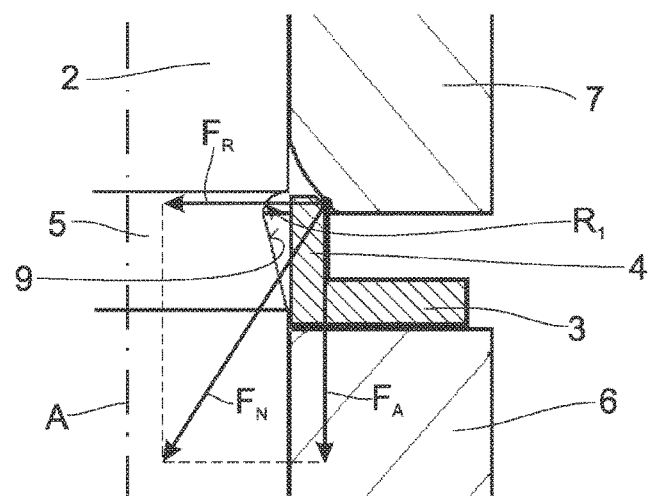
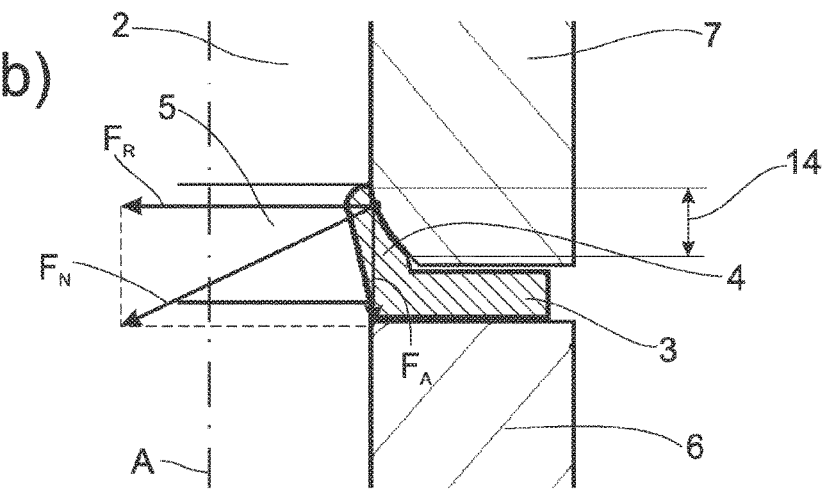
Fig. 2
PRIOR ART

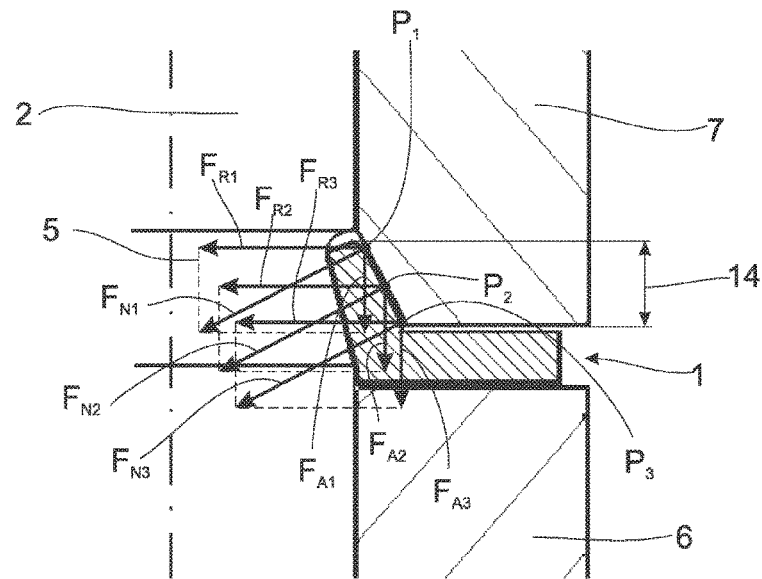
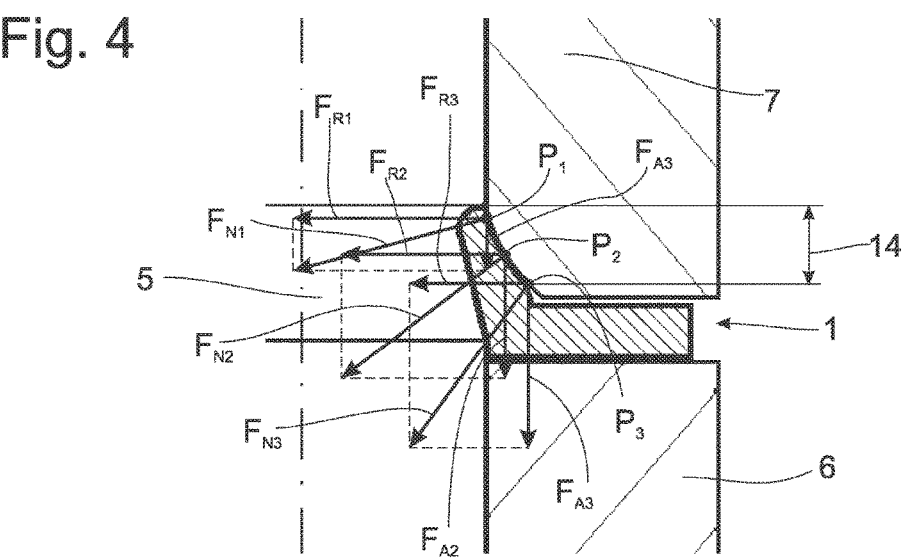
PRIOR ART

METHOD FOR FASTENING A REBOUND STOP TO A PISTON ROD OF A VIBRATION DAMPER

CROSS REFERENCE TO RELATED APPLICATIONS

This is a U.S. national stage of application No. PCT/EP2014/069977, filed on Sep. 19, 2014. Priority is claimed on German Application No. DE102013220627.5, filed Oct. 14, 2013, the content of which is incorporated here by reference.

BACKGROUND OF THE INVENTION

1. Field of the Invention

The present invention is directed to a method for fastening a rebound stop to a piston rod of a vibration damper and to the piston rod/rebound stop assembly produced in so doing. Vibration dampers having a piston rod/rebound stop assembly as component part are well known in the automobile industry. These vibration dampers comprise at least one working cylinder which is at least partially filled with a damping medium and at least one piston arranged inside the working cylinder so as to be axially displaceable with respect to the longitudinal axis of the working cylinder and which divides the working cylinder into two working chambers. The piston is connected on one side to a piston rod which is sealingly guided out of the working cylinder through a piston rod guide and is fixed to a further fastening component part of a motor vehicle. The piston generally has at least one orifice which joins the two working chambers and at least one throttle disk which at least partially covers the orifice on one side.

Conventionally, the end of the working cylinder remote of the piston rod is closed by a cylinder base and is at least indirectly arranged at a component of the motor vehicle that supports the vehicle wheel. When the piston is axially displaced inside the working cylinder, one working chamber becomes smaller and the other working chamber becomes larger. The relative change in size of the two chambers results in a pressure difference between the two chambers which allows the damping medium to flow out of the smaller working chamber through the orifice of the piston into the larger working chamber. The throttle disk inhibits the flow of the damping medium, which causes a damping effect.

2. Description of the Prior Art

In some operating conditions, for example, when driving over potholes, that the piston will move at a greater velocity in direction of the piston rod guide and strike the latter. This can lead to a leak in the piston rod seal or can damage the piston. To avoid this, vibration dampers are outfitted with a rebound stop that is axially fastened to the piston rod and serves to prevent the above-described collision between piston and piston rod guide.

The rebound stop can be fastened to the piston rod in different ways. It can be welded to the piston rod or connected to the piston rod in some other way by bonding. Since the piston rod is a highly precise component part that ideally may not have any deformations after the piston rod is fabricated, the bonding connection between the rebound stop and the piston rod is very inconvenient and entails high costs.

Further, the piston rod can have a circumferential groove as disclosed, for example, in DE 78 10 988 U1. The groove receives a snap ring and secures a rebound stop axially to the piston rod. This fastening method is common. To fasten the snap ring to the piston rod, the snap ring must be opened so that it can pass over the portion of the piston rod preceding the circumferential groove, if possible without contacting this portion. The snap ring then engages in the circumferential groove of the piston rod and secures the rebound stop axially to the piston rod. In addition, a possibility for axial fastening must be implemented for fixing the snap ring to the piston rod so that the snap ring cannot slip out of the groove under heavy loading of the rebound stop. Therefore, the above-mentioned fastening can also be cost-intensive.

A positive-engagement connection of the rebound stop to the piston rod can also be implemented in that the rebound stop is axially fastened to the piston rod through pressing as is disclosed in DE 78 10 988 U1 or DE 85 20 989 U1.

DE 10 2011 089 140 B3 also shows a rebound stop which encompasses around the piston rod in circumferential direction and which is axially fastened to the piston rod between the piston and the piston rod guide. The rebound stop is connected to the piston rod by frictional engagement. According to the constructional variant shown in DE 10 2011 089 140 B3, the piston rod has a circumferential groove, and the rebound stop is pressed into the groove to implement the positive-engagement connection between the piston rod and the rebound stop.

A fastening method having at least two method steps, for example, is known from the prior art. In the first method step, a rebound stop is positioned at a piston rod. The rebound stop encompasses the piston rod in circumferential direction and has a disk-shaped portion and, adjacent thereto, a tubular portion facing the piston rod. The piston rod has a circumferential groove.

The rebound stop is axially supported by the disk-shaped portion at a first tool component and is axially positioned such that the tubular portion of the rebound stop at least partially covers the circumferential groove of the piston rod. In the second method step, a second tool component encompassing the piston rod in circumferential direction is brought into contact with the tubular portion of the rebound stop. The contact surface of the second tool component is sloped, in particular the surface is conical, with a constant pitch, and the cone narrows radially inwardly in direction of the piston rod.

The first tool component and the second tool component then carry out an axial relative movement with respect to the longitudinal axis of the piston rod directed toward one another so that the distance between the two tool components is reduced to a defined final dimension.

In this respect, the second tool component exerts a pressing force directed axially in direction of the disk-shaped portion and a pressing force directed radially inward, i.e., toward the center of the piston rod, on the tubular portion of the rebound stop and presses the latter into the circumferential groove of the piston rod.

A disadvantage of this solution is that as the distance between the tool components decreases an increasingly greater radial pressing force is required to allow an optimal pressing and, therefore, an optimal contact of the tubular portion of the rebound stop in the circumferential groove of the piston rod.

A decrease in the axial pressing force during the decrease in the distance between the tool components is not desirable because this would inevitably lead to rapid tool wear.

SUMMARY OF THE INVENTION

It is an object of the present invention to further develop the fastening method mentioned above in such a way that an optimal contact of the tubular portion of the rebound stop in the circumferential groove of the piston rod is achieved and tool wear can nevertheless be minimized.

By changing the pitch angle of the press-in surface with reduction of the distance between the tool components, the force ratio between the axially directed pressing force and the radially directed pressing force changes such that the axially directed pressing force is reduced and the radially directed pressing force is increased.

As a result of a large radially directed pressing force, an optimal contact of the tubular portion of the rebound stop in the circumferential groove of the piston rod is achieved, and the axially directed pressing force during a press-in process is reduced such that the tool is protected.

According to an advantageous constructional variant, the press-in surface of the second tool component can be constructed to be at least partially convex. In this case, the tubular portion of the rebound stop would have a press-in portion which has a circumferential, at least partially concave surface. Further details and advantages of the present invention result from the following description of an embodiment example in conjunction with the drawings.

BRIEF DESCRIPTION OF THE DRAWINGS

The drawings show:

FIGS. 2a)-b) are an exemplary illustration of a fastening method according to patent claim 1;

FIG. 3 is a diagram showing the force ratio according to the fastening method of the prior art;

FIG. 4 is a diagram showing the force ratio; and

DETAILED DESCRIPTION OF THE PRESENTLY PREFERRED EMBODIMENTS

Figure 1:
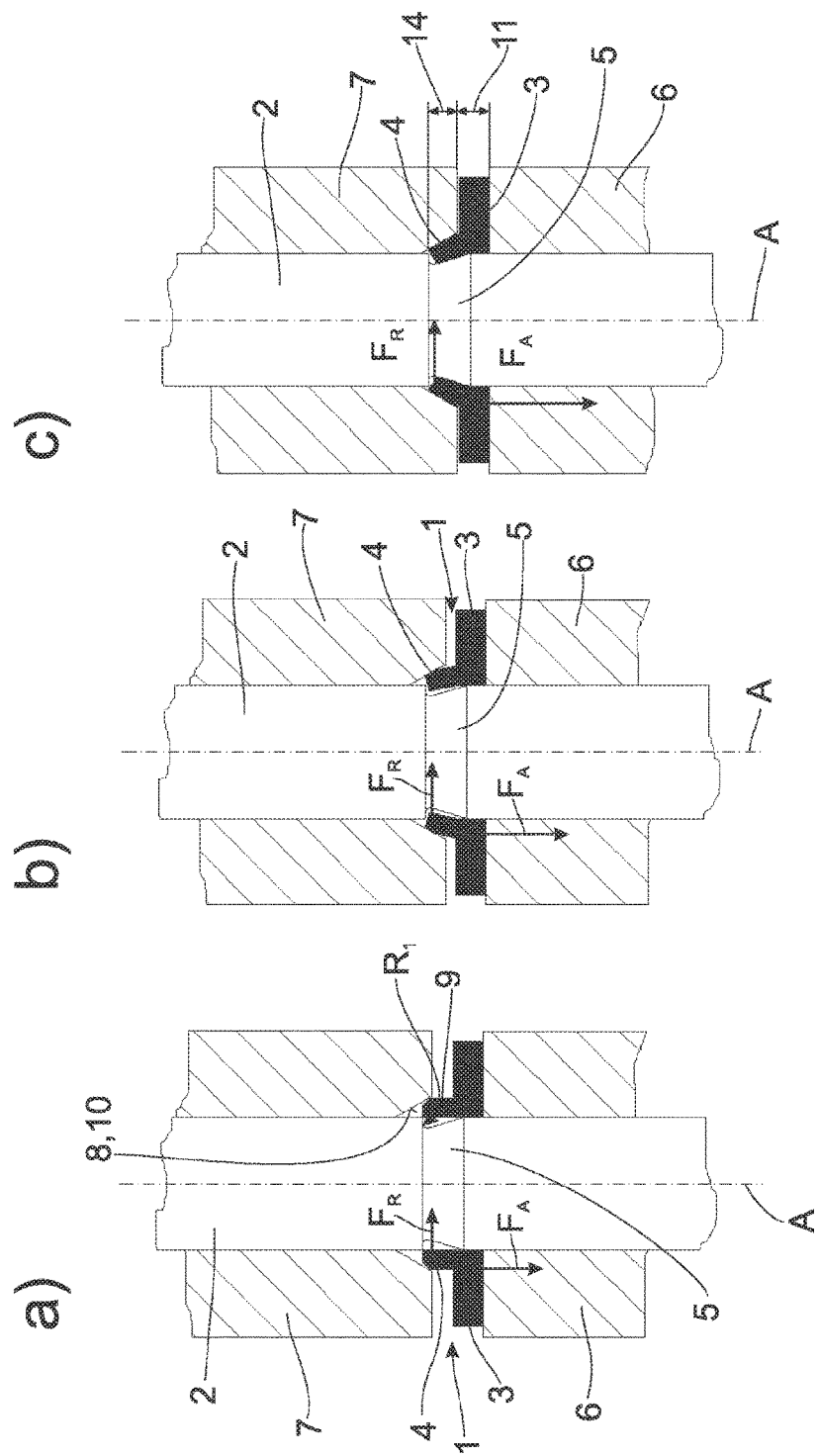
FIGS. 1a)-c) are a step-by-step illustration of a fastening method known from the prior art.

FIG. 1a), FIG. 1b), FIG. 1c) and FIG. 3 show a fastening method known from the prior art wherein a rebound stop 1 is positioned at and fixed to a piston rod 2. The rebound stop 1 encompasses the piston rod 2 in circumferential direction and has a disk-shaped portion 3 and, adjoining the latter, a tubular portion 4 facing the piston rod 2. The piston rod 2 has a circumferential groove 5. In the embodiment example shown in the drawing, the groove 5 has a contact portion 9 for contacting the tubular portion 4, this contact portion 9 being constructed oblique to the longitudinal axis A of the piston rod 2. Further, the groove has a radius R which serves to prevent a notch effect.

The rebound stop 1 is axially supported by the disk-shaped portion 3 at a first tool component 6 and is axially positioned such that the tubular portion 4 of the rebound stop 1 at least partially covers the circumferential groove 5 of the piston rod 2. A second tool component 7 encompassing the piston rod 2 in circumferential direction is brought into contact with the tubular portion 4 of the rebound stop 1 at the press-in surface 8 thereof. The shape of the press-in surface 8 of the second tool component 7 is defined by a cone-shaped recess 10 in the second tool component 7 and extends obliquely with constant pitch with respect to the longitudinal extension axis A of the piston rod 2, and the cone narrows radially over its entire longitudinal extension in direction of the piston rod 2.

The first tool component 6 and the second tool component 7 then carry out an axial relative movement with respect to the longitudinal axis A of the piston rod 2 directed toward one another so that the distance between the two tool components 6; 7 is reduced to a defined final dimension 11. In so doing, the second tool component 7 exerts a normal force $F_N$ on the tubular portion 4 of the rebound stop 1, which normal force $F_N$ is directed in direction of the normal vector, i.e., perpendicular to the press-in surface 8, and presses the tubular portion 4 of the rebound stop 1 into the circumferential groove 5 of the piston rod 2.

For better comprehension of the manner of functioning, the normal force $F_N$ can be broken up vectorially into a pressing force $F_A$ directed axially in direction of the disk-shaped portion 3 and a pressing force $F_R$ directed radially inward, i.e., toward the center axis A of the piston rod 2.

Due to the constant pitch angle of the press-in surface 8, the direction of action of the normal force $F_N$ and, therefore, also the force ratio between the axially directed pressing force $F_A$ and the radially directed pressing force $F_R$ is always constant.

In FIG. 3, the force ratio of the forces acting on the tubular portion 4 of the rebound stop 1 are shown by way of example and in a clearer manner at three acting points $P_1$, $P_2$ and $P_3$ along the press-in portion 14. The direction of action of the normal force $F_{N1}$, $F_{N2}$ and $F_{N3}$ acting on points $P_1$, $P_2$ and $P_3$ is always the same because of the constant pitch, so that the respective force ratio of radially directed force $F_{R1}$, $F_{R2}$, $F_{R3}$ to the respective associated axially directed force $F_{A1}$, $F_{A2}$, $F_{A3}$ is always equal.

In order to achieve an optimal contact of the rebound stop 1 at the surface of the contact portion 9 in the groove 5, a very high radially directed pressing force $F_R$ must be exerted on the tubular portion 4 and, accordingly, successively increased during the pressing process.

Owing to the constant force ratio between the radially directed pressing force $F_R$ and the axially directed pressing force $F_A$, the axially directed pressing force $F_A$ increases in proportion to the increase in the radially directed pressing force $F_R$, which highly stresses the tool components 6; 7.

FIG. 2a), FIG. 2b) and FIG. 4 show the fastening method according to claim 1. The press-in surface 8 of the second tool component 7 is constructed such that the pitch angle of the press-in surface 8 varies at least partially over the axial longitudinal extension of the press-in surface 8 so that as the distance between the tool components 6, 7 is reduced the force ratio between the axially directed pressing force $F_A$ and the radially directed pressing force $F_R$ changes such that the axially directed pressing force $F_A$ decreases and the radially directed pressing force $F_R$ increases.

The very high radially directed pressing force $F_R$ that can be achieved presses the tubular portion 4 of the rebound stop 1 into the circumferential groove 5 of the piston rod 2, which allows an optimal contact of the tubular portion 4 at the contact portion 9 of the groove 5 and at the radius $R_1$ adjoining the latter. The circumferential groove 5 of the piston rod 2 virtually completely takes up the material of the tubular portion 4 of the rebound stop 1 that is displaced from the second tool component 7 by the high radially directed pressing force $F_R$.

Figure 5:
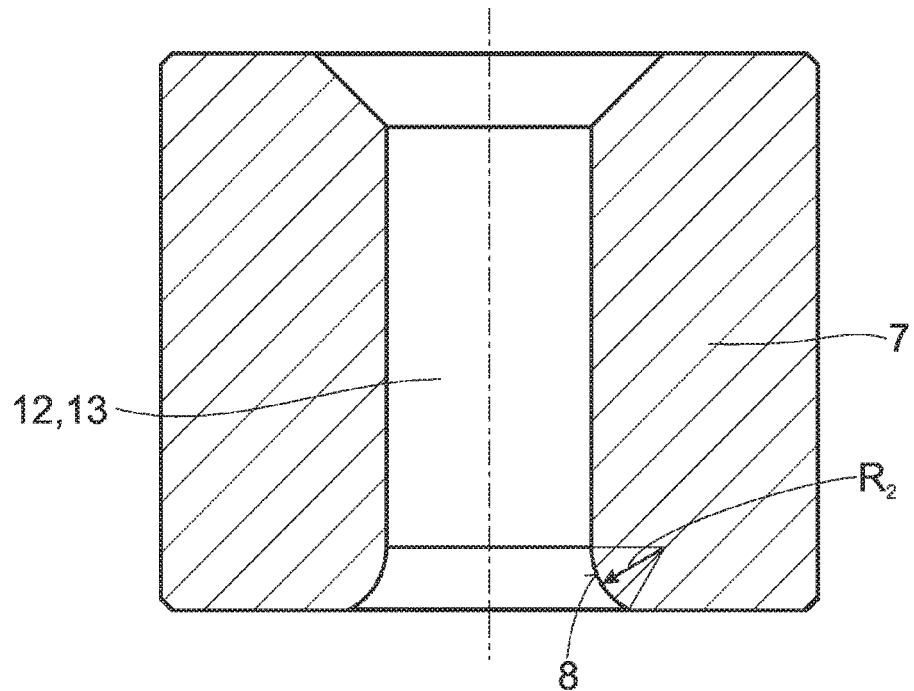
FIG. 5 is a sectional view of a possible constructional variant of the second tool component.

FIG. 5 shows an exemplary constructional variant of the second tool component 7. The second tool component 7 has a receiving portion 12 for receiving the piston rod 2, which receiving portion 12 can be constructed as a receiving bore hole 13, and a press-in surface 8 adjoining it. The press-in surface 8 of the second tool component 7 is formed convexly. Further, the press-in surface 8 has a radius $R_2$ which is shown in cross section. Of course, the press-in surface 8 can also be realized without a radius and instead, for example, as a succession of portions with different pitch. This constructional variant is not shown explicitly, but is also possible.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for fastening a rebound stop to a piston rod of a vibration damper, comprising:
   positioning a rebound stop at a piston rod, wherein
   the rebound stop has a tubular portion that encompasses the piston rod in circumferential direction and is axially supported with respect to a longitudinal axis at a first tool component,
   the piston rod has a circumferential groove, and
   an axial position of the rebound stop is selected such that the tubular portion of the rebound stop at least partially covers the circumferential groove of the piston rod;
   at least partially pressing the tubular portion of the rebound stop into the circumferential groove of the piston rod so that a second tool component having a press-in surface for comes in contact by its press-in surface with the tubular portion of the rebound stop;
   wherein the first tool component and the second tool component carry out an axial relative movement with respect to the longitudinal axis of the piston rod directed toward one another so that a distance between the first tool component and the second tool component is reduced to a defined final dimension;
   exerting, by at least one tool component, an axially directed pressing force and a radially directed pressing force directed radially inward toward a center of the piston rod, on the tubular portion of the rebound stop and presses it into the circumferential groove of the piston rod,
   wherein a pitch angle of the press-in surface varies at least partially over an axial longitudinal extension of the press-in surface so that, as the distance between the first tool component and the second tool component decreases, a force ratio between the axially directed pressing force and the radially directed pressing force changes such that the axially directed pressing force decreases and the radially directed pressing force increases.

2. The method for fastening a rebound stop to a piston rod of a vibration damper according to claim 1, wherein the press-in surface of the second tool component is at least partially convex.

3. The method for fastening a rebound stop to a piston rod of a vibration damper according to claim 2, wherein the second tool component has a receiving portion configured as a bore for receiving the piston rod and the at least partially convex press-in surface of the second tool component begins directly adjacent to a wall defining the bore.

4. The method for fastening a rebound stop to a piston rod of a vibration damper according to claim 2, wherein the second tool has a face that faces the first tool component and is substantially perpendicular to the longitudinal axis, the at least partially convex press-in surface of the second tool component ends at the face.

5. Method for fastening a rebound stop to a piston rod of a vibration damper according to claim 1, wherein the tubular portion of the rebound stop has a press-in portion, wherein the latter has a circumferential, at least partially concave surface.

6. The method for fastening a rebound stop to a piston rod of a vibration damper according to claim 1, wherein the circumferential groove is oblique to the longitudinal axis.

* * * * *